United States Patent

Kristensen et al.

[11] Patent Number: 6,151,429
[45] Date of Patent: Nov. 21, 2000

[54] POLARISATION ASYMMETRIC ACTIVE OPTICAL WAVEGUIDE, METHOD OF ITS PRODUCTION, AND ITS USES

[75] Inventors: Martin Kristensen; Jörg Hübner, both of Lyngby; Poul Varming, Copenhagen, all of Denmark; Milan Sejka, Ottawa, Canada; Bera Pálsdóttir, Copenhagen, Denmark

[73] Assignees: Ionas A/A, Brodby; Lucent Tech, Denmark, Lyngby, both of Denmark

[21] Appl. No.: 09/364,392

[22] Filed: Jul. 30, 1999

Related U.S. Application Data

[63] Continuation of application No. PCT/DK98/00056, Feb. 13, 1998.
[60] Provisional application No. 60/040,415, Mar. 13, 1997.

[30] Foreign Application Priority Data

Feb. 13, 1997 [DK] Denmark ................................ 0168/97

[51] Int. Cl.[7] .................................................. G02B 6/126
[52] U.S. Cl. ............................................ 385/11; 385/126
[58] Field of Search ............................. 385/11, 141–145, 385/123, 126, 127, 128

[56] References Cited

U.S. PATENT DOCUMENTS

| | | | |
|---|---|---|---|
| 5,056,888 | 10/1991 | Messerly et al. ................. | 385/123 |
| 5,134,620 | 7/1992 | Huber ................................ | 372/6 |
| 5,473,622 | 12/1995 | Grubb ............................... | 372/6 |

FOREIGN PATENT DOCUMENTS

| | | |
|---|---|---|
| 0689067 | 12/1995 | European Pat. Off. . |
| 9210014 | 6/1992 | WIPO . |

OTHER PUBLICATIONS

Huang et al. Polarization Rotation in Periodic Loaded Rib Waveguides, Journal of Lightwave Technology, pp1825–1831, Dec. 1992.

*Primary Examiner*—Rodney Bovernick
*Assistant Examiner*—Ellen E. Kim
*Attorney, Agent, or Firm*—Ladas & Parry

[57] ABSTRACT

A method of producing an active optical waveguide having asymmetric polarization, said method comprising the steps of (a) providing an active optical waveguide (10) comprising: (i) a transverse refractive index profile (21) comprising a guiding region (11), an intermediate region (13), and a non-guiding region (12); (ii) a transverse photorefractive dopant profile (31) comprising a constant or graded photorefractive dopant concentration within at least one of the guiding, non-guiding and intermediate regions, except that the photorefractive dopant is not located solely in the guiding region; and (iii) exhibiting in said guiding region, intermediate region, or both, light guiding modes having different polarizations; and (b) exposing at least a part (10*a*, 10*b*) of the active optical waveguide to an effective transverse illumination of light (20) reacting with the photorefractive dopant and modifying said transverse refractive index profile; said part of the active optical waveguide being exposed to a fluence selectively suppressing the propagation of the light guiding modes having different polarizations so that the propagation of one mode is less suppressed than the propagation of the other mode(s). Such an active optical waveguide, single polarization mode optical waveguide lasers and multi-wavelength single polarization mode optical waveguide lasers comprising such an active optical waveguide, methods of their production, and their uses in telecommunications, in spectroscopy, in sensors and in absolute calibrated laser light sources.

32 Claims, 13 Drawing Sheets

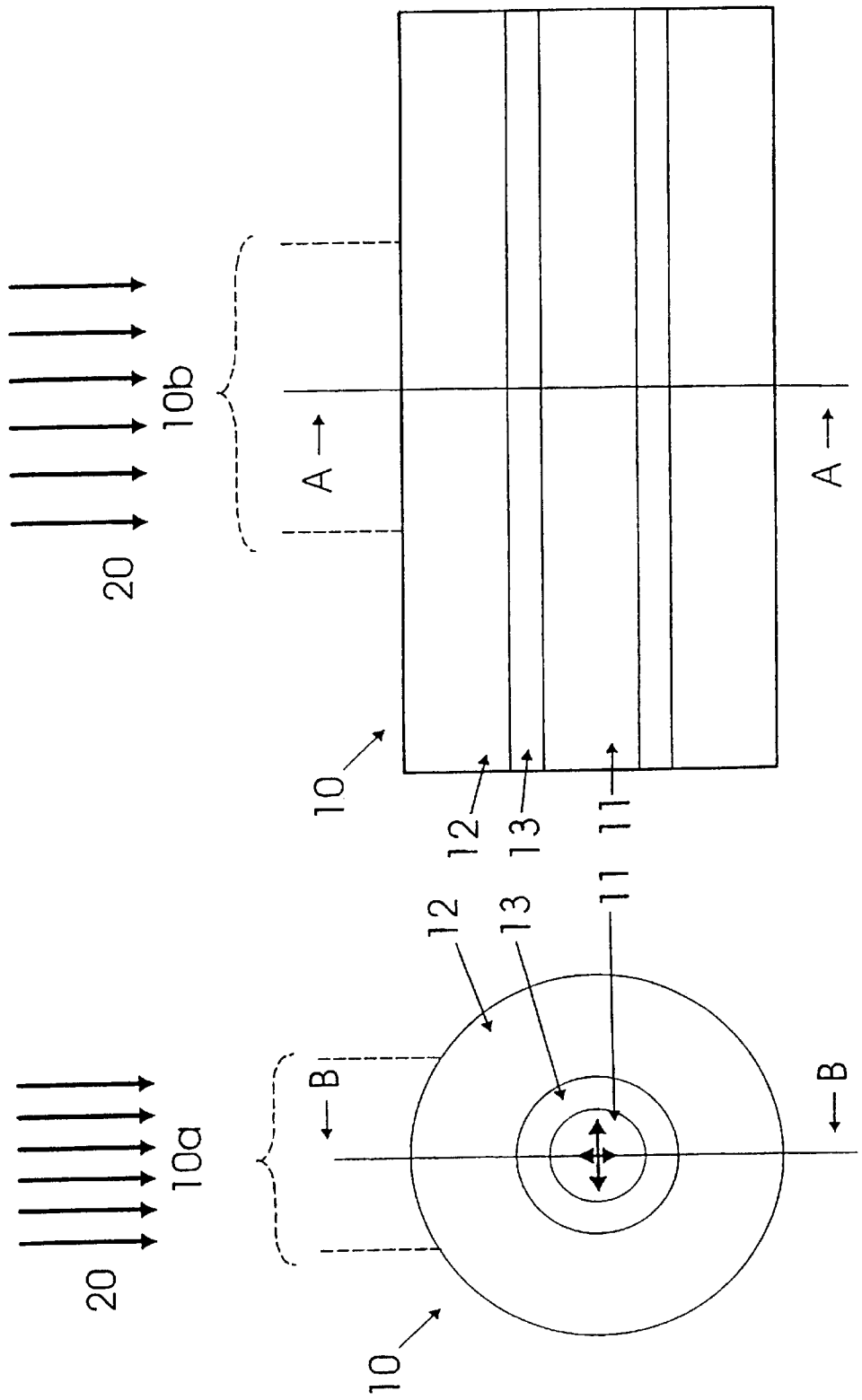

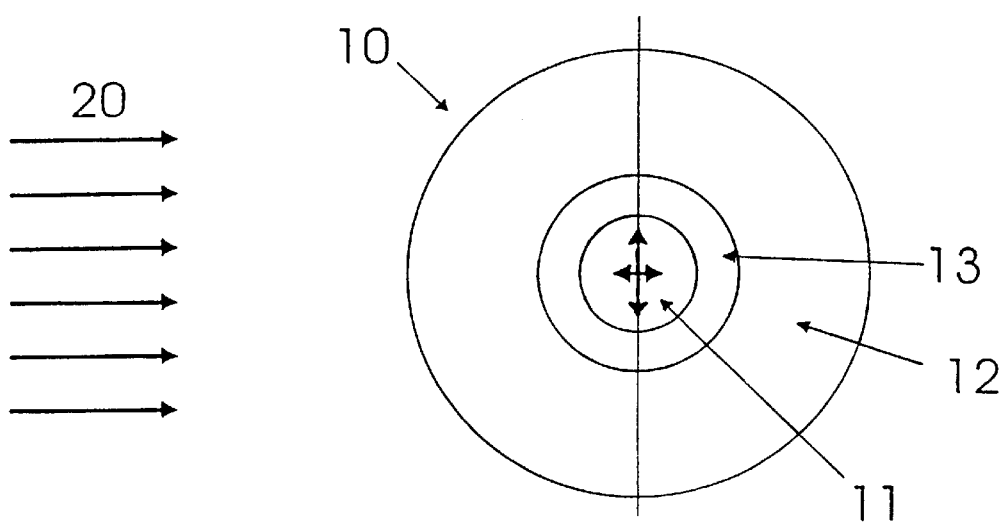
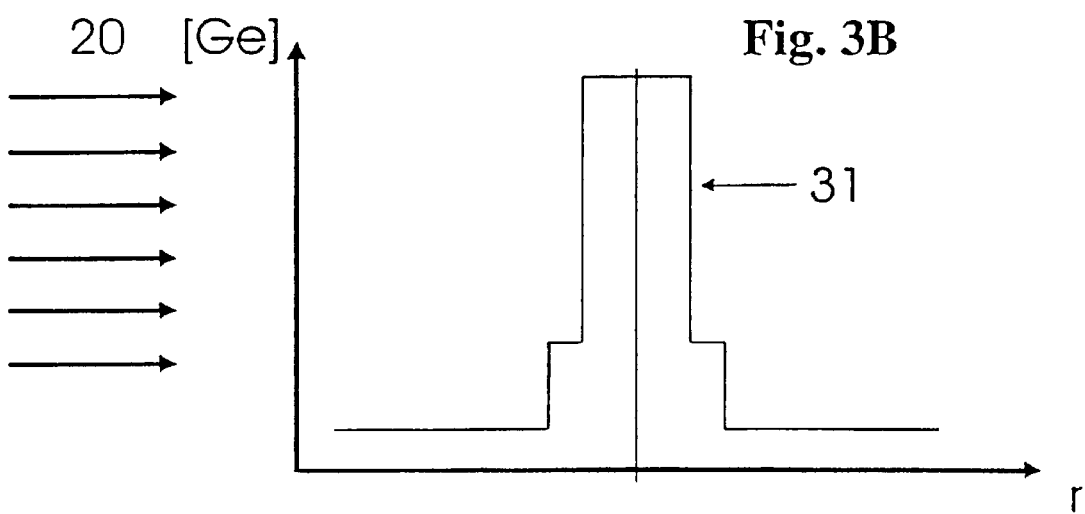

POLARISATION ASYMMETRIC ACTIVE OPTICAL WAVEGUIDE, METHOD OF ITS PRODUCTION, AND ITS USES

This application is a continuation of PCT/DK98/00056 filed Feb. 13, 1998 and Provisional application Ser. No. 60/040415 filed Mar. 13, 1997.

1. BACKGROUND OF THE INVENTION

The present invention relates to a method of producing a polarisation asymmetric active optical waveguide, a polarisation asymmetric active optical waveguide obtainable by the method; a method of producing a single polarisation mode optical waveguide laser having a pump light source and distributed feedback or distributed Bragg reflector, a single polarisation mode optical waveguide laser having a pump light source and distributed feedback or distributed Bragg reflector obtainable by the method; in particular a multi-wavelength single polarisation mode optical waveguide laser having a pump light source and distributed feedback or distributed Bragg reflector; and uses of such a polarisation asymmetric active optical waveguide and single polarisation mode optical waveguide lasers, in particular in telecommunication networks, in spectroscopy, in sensors, and in absolute calibrated laser light source.

The Technical Field

Active optical waveguides doped with active dopant such as erbium and based on phase-shifted Bragg gratings can provide single longitudinal mode laser operation with narrow line widths, e.g. in the kilohertz range, simple designs and direct compatibility with optical fiber networks, e.g. the so-called optical fiber distributed feedback (DFB) or distributed Bragg reflector (DBR) lasers.

Normally single longitudinal mode phase-shifted DFB lasers operate in two orthogonal polarisation modes with slightly different resonant wavelength. However, power exchanges between two polarisation modes limit their use in optical communication applications because of instabilities in the laser output power implied by this power exchange between the modes and e.g. temperature and vibration sensitivity of the laser cavities.

Consequently, there is a need for ensuring single polarisation state operation in active optical waveguides, in particular in optical fiber DFB and DBR lasers.

Prior Art Disclosures

Hübner et al., Electronics Letters, Vol. 33, No. 2, 1997, 139–140 discloses single mode UV-induced distributed feedback (DFB) fiber lasers with a line width of <15 kHz and a side mode suppression better than 61 dB. The stability of the lasers is verified by a 10 Gbit/s transmission experiment. Five DFB fiber lasers are cascaded and pumped by a single semiconductor laser, thereby forming a multiwavelength source for WDM systems. Polarisation and longitudinal single mode operation has been verified continuously without mode-hopping from room temperature up to 200° C. However, it has neither been indicated nor suggested how polarisation single mode operation was achieved.

Varming et al., Electronics Letters, Vol. 31, No. 17, 1995, 1445–1446 discloses a single polarisation mode fiber laser with distributed feedback comprising a germanoaluminosilicate erbium doped fiber having a Bragg grating with a permanent π/2 phase-shift induced by UV light exposure of the central part of the grating thereby locally increasing the background refractive index. Nothing is indicated nor suggested about how to provide single polarisation mode operation of the fiber laser.

GB 2 299 203 discloses an optical fiber laser with distributed feedback comprising an amplifying optical fiber doped with one or more rare earth elements and having a fiber Bragg-grating with at least one phase discontinuity providing lasing at two orthogonal polarisation modes, which optical fiber changes its effective indices of birefringence of the laser mode upon exposure to external pertubations, e.g. pressure and temperature. Nothing is indicated nor suggested about providing single polarisation mode operation for the laser mode.

International application publication no. WO 94/19713 discloses a method of fabricating an optical waveguide grating comprising the step of thermally damaging selected regions of the waveguide by exposure of those regions to transversal optical illumination, whereby it is possible, using a purely optical technique, to fabricating gratings on a production-line basis. The method uses thermal damage of the material providing large effective index changes in the proximity of the damaged regions. Nothing is indicated nor suggested about providing single polarisation mode operation of the waveguide.

Harutjunian et al., Electronics Letters, Vol. 32, No.4, 1996, 346–348 disclose a single polarisation twisted distributed feedback fiber laser wherein single polarisation operation in the DFB fiber laser is achieved by the introduction of externally induced circular birefringence uniformly distributed along the DFB laser. Introduction of linear birefringence by transverse stress or bending and introduction of circular birefringence by twisting are disclosed. The manufacture of the twisted optical fiber includes a mechanical twist of the fiber which is difficult to control and which introduces the risk of breaking the fiber. Further, the twisted optical fiber requires a special packaging to be maintained in stable conditions in the twisted state during e.g. temperature variation during its use, e.g. in a DFB optical fiber laser.

EP-A2-0 689 067 discloses a method of producing an optical waveguide system by irradiating a photorefractive material whose refractive index changes with light irradiation, forming an optical waveguide or refractive index distribution while inducing self-focusing. Nothing is suggested nor indicated about producing an active optical waveguide having asymmetric polarization.

U.S. Pat. No. 5,473,622 discloses a master-oscillator power amplifier configuration for a cladding-pump laser, the configuration having an oscillation section incorporated in a single mode core doped with ionized rare earth elements and with refractive-index modifying dopants, said core being surrounded by a first cladding and a second cladding, and having an amplifying section. Nothing is suggested nor indicated about an active optical waveguide having asymmetric polarization.

U.S. Pat. No. 5,134,620 discloses a rare earth doped optical transmission medium laser with longitudinal mode selection comprising mode suppression means including an optical grating within the transmission medium. In an embodiment consisting of a ring cavity laser comprising an erbium-doped optical fiber, undesired polarization modes are prevented from lasing by including in the ring an optical isolator that only passes one polarization. Nothing is suggested nor indicated about an active optical waveguide having asymmetric polarization.

U.S. Pat. No. 5,056,888 discloses a single-mode, single-polarization optical fiber comprising a core and a cladding including an asymmetric stress-applying region which causes the fiber to be birefringent and which can polarize light or propagate polarized light. Nothing is indicated nor suggested about an active optical waveguide having asymmetric polarization, or such a waveguide being photosensitive or rare earth doped.

International application publication no. WO 92/10014 discloses an active optical waveguide having a longitudinal varying structure in which at least one of the parameters of the extent of guiding region, the extent of active dopant, and the refractive index difference varies along the length of the waveguide. Nothing is indicated nor suggested about an active optical waveguide having asymmetric polarization.

Storoy et al. "Single polarisation fibre DFB laser", Electronics Letters, Vol. 33, No. 1, 1997, 56–58, discloses a single polarisation fiber DFB laser based on a standard AT&T HG 980 fiber without further photosensitising having a phase-shift post-tuned grating exposed slightly off-center of the grating to a uniform UV light thus raising the index of that area of the grating. An introduced birefringence of $7.5 \times 10^{-6}$ is disclosed. Nothing is indicated nor suggested about an active optical waveguide having asymmetric polarisation based on the active optical waveguide comprising a guiding region containing an active dopant, a non-guiding region surrounding the guiding region, and an intermediate region, at least one of said regions being doped with a photorefractive dopant.

2. DISCLOSURE OF THE INVENTION

Object of the Invention

It is an object of the present invention to provide an active optical waveguide which exhibits polarisation asymmetry, in particular an active optical waveguide which when used in a cavity ensures a robust single polarisation mode operation and a high degree of immunity against environmental disturbances such as temperature fluctuations, acoustic or mechanical vibrations, and a method of producing such a waveguide.

In particular it is the object to provide such an improved polarisation asymmetric active optical waveguide which exhibits a high stability in output power when exposed to environmental disturbances when used in an optical fiber DFB or DBR laser in telecommunication networks.

It is another object of the present invention to provide single polarisation mode optical waveguide lasers having pump light source and distributed feedback or distributed Bragg reflector, in particular multi-wavelength single polarisation mode optical waveguide lasers, and methods of producing such lasers.

It is still another object of the present invention to provide such a polarisation asymmetric active optical waveguide and such single and multi-wavelength single polarisation mode optical waveguide lasers for use in particular in telecommunication networks, in spectroscopy, in sensors, and in absolute calibrated laser light sources.

Still further objects will become apparent from the accompanying description.

Solution According to the Invention

According to an aspect of the invention these objects are fulfilled by providing a method of producing an active optical waveguide having asymmetric polarisation, said method comprising the steps of:

(a) providing an active optical waveguide comprising:
  (i) a transverse refractive index profile comprising a guiding region containing an active dopant, a non-guiding region surrounding the guiding region, and an intermediate region between said guiding and non-guiding regions, said intermediate region optionally having the same refractive index as the non-guiding region,
  (ii) a transverse photorefractive dopant profile having a constant or graded photorefractive dopant concentration within at least one of said guiding, non-guiding and intermediate regions, except that the photorefractive dopant is not located solely in the guiding region, and
  (iii) exhibiting in said guiding region, intermediate region, or both, light guiding modes having different polarisations;
(b) and exposing at least a part of the active optical waveguide to an effective transverse illumination of light reacting with the photorefractive dopant and modifying said transverse refractive index profile;
  said part of the active optical waveguide being exposed to a fluence selectively suppressing the propagation of the light guiding modes having different polarisations so that the propagation of one mode is less suppressed than the propagation of the other mode(s);
whereby it is ensured that an active optical waveguide having polarisation asymmetry can be obtained.

Especially, the transverse photorefractive dopant profile having a constant or graded photorefractive dopant concentration within at least one of said guiding, non-guiding and intermediate regions, except that the photorefractive dopant is not located solely in the guiding region, ensures an improved polarisation asymmetry compared to that of the prior art.

It surprisingly turns out that such an active optical waveguide having polarisation asymmetry when used in a cavity ensures a robust single polarisation mode operation, and a high degree of immunity against environmental disturbances such as temperature fluctuations, and/or acoustic or mechanical vibrations.

Specifically, the active optical waveguide having polarisation asymmetry according to the invention exhibits excellent properties when used in fiber optical lasers, in particular fiber optical distributed feedback and distributed Bragg reflector lasers.

These properties comprise effects such as longitudinal and polarisation single mode operation, narrow line width, efficient side-mode suppression, high polarisation stability, low amplitude noise and low frequency noise.

It is assumed, but the explanation of the invention is not limited thereto, that the method of producing an active optical waveguide having asymmetric polarisation according to the invention involves incorporating different means of suppressing light propagation in the light guiding modes having different polarisations so that the propagation of light in one mode is less suppressed than the propagation of light in the other modes; said means being incorporated by one or more of the following effects induced in the active optical waveguide:

a) birefringence, i.e. asymmetrical changes in refractive index and/or induced stress giving rise to different refractive indices $n_\alpha$ and $n_\beta$, where $\alpha$ and $\beta$ are basis vectors in polarisation space;

b) absorption, i.e. photoreactions between the illuminating light and the active waveguide materials induce asymmetric loss effects due to the decreasing light intensity through the active optical waveguide;

c) mode stripping, i.e. photoreactions between the illuminating light and the photorefractive dopant induce asymmetric refractive index modifications, in the example of germanium (Ge) as dopant a refractive index elevation, due to the decreasing light intensity through the active optical waveguide and the given photorefractive dopant profile, which refractive index modification will allow light guiding modes having different polarisations to couple to cladding and leak out depending on the polarisation of the mode; and d) anisotropic gain factor modification, i.e. the photoreactions between the illuminating light and the active dopant, e.g. erbium (Er), modify asymmetrically the polarisation dependent gain factor of the active optical waveguide, thereby favouring gain of light of certain polarisations.

An Active Optical Waveguide

The active optical waveguide used according to the invention is known in the art. In preferred embodiments they generally comprise active planar and active fiber optical waveguides.

An active optical waveguide to be used in the present method according to the invention can be produced according to methods known in the art, e.g. in the example of optical fiber waveguides, such methods as modified chemical vapor deposition (MCVD) and solution doped fibers (SODOF) techniques, but other methods can be applied.

These techniques enable the provision of a transverse refractive index profile comprising a guiding region containing an active dopant, a non-guiding region surrounding the guiding region, and an intermediate region between said guiding and non-guiding regions by varying the amounts and reaction conditions, e.g. temperature and flow, for the various dopants or dopant precursors, e.g. dopant-chlorides such as $SiCl_3$, $POCl_3$, and $GeCl_4$, or F, and $ErCl_3$ during the manufacturing process of a preform which subsequently is drawn to a fiber using known drawing techniques in the art, see e.g. G. Keiser, "Optical Fiber Communications", McGraw-Hill, Inc., New York, 1991.

In a preferred embodiment, the active optical waveguide comprises a silica based material doped with a refractive index modifying dopant selected from the group consisting of boron (B), nitrogen (N), fluorine (F), aluminium (Al), phosphor (P), titanium (Ti), germanium (Ge), and tin (Sn), and dopants selected from the group of rare earth elements consisting of La, Ce, Pr, Nd, Gd, Dy, Ho, Er, Tm, and Yb, or combinations of these.

In general the guiding, the intermediate and the non-guiding regions may have different refractive indices, but they can be matched refractive indices as well. For example the intermediate region may have the same refractive index as the non-guiding region, i.e. a so-called matched-cladding index profiles.

According to the invention, an active optical waveguide to be used in the present method comprises a transverse photorefractive dopant profile having a constant or graded photorefractive dopant concentration within at least one of said guiding, non-guiding and intermediate regions, except that the photorefractive dopant is not located solely in the guiding region. This transverse photorefractive dopant profile is provided by use of the above mentioned MCVD or SODOF techniques, preferably co-doping with the other dopants.

In general the dopant profile is adapted to the specific refractive index profile in order to provide a desired modified transverse refractive index profile.

Generally, the dimensions of the guiding, the intermediate and the non-guiding regions are chosen to obtain either single-mode or multi-mode operation. Therefore, active optical waveguides, e.g. active optical fibers, according to the invention exhibit in the guiding region, intermediate region, or both, light guiding modes having different polarisations.

Effective Transverse Illumination of Light

According to the invention, at least a part of the active optical waveguide is exposed to an effective transverse illumination of light which light is able to react with the photorefractive dopant and to modify the transverse refractive index profile.

Suitable photorefractive dopants and illumination lights are known in the art.

According to the invention, the active optical waveguide is being exposed to a fluence of the illumination light which is able to provide selective suppression of the propagation of the light guiding modes having different polarisations to such an extent that the propagation of light in one mode is less suppressed than the propagation of light in the other mode(s).

In practice the skilled person is able to decide when a sufficient fluence has been obtained by simply measuring the light propagation of the active optical waveguide, e.g. by means of a fiber polarisation controller, a polarizer and a power meter; or a high-Q Fabry-Perot interferometer in which different modes can be resolved, and then decide when a measured polarisation asymmetry is sufficient for the intended application, e.g. to be used in a polarisation single mode fiber optical FDB or DBR laser.

Preferred Embodiments

The transverse refractive index profile, the active dopant, the transverse photorefractive dopant profile, and the transverse illumination of light can be chosen to optimise the induced effects in the active optical waveguide.

In a preferred embodiment, the modified transverse refractive index profile has elevated refractive indices in the guiding region and across the boundary region between the guiding region and the intermediate region, and/or in the intermediate region, compared to the transverse refractive index profile before being exposed to the transverse illumination of light.

Transverse Refractive Index Profile

The transverse refractive index profiles can be any suitable refractive index profile known in the art. In preferred embodiments of optical fibers, the transverse refractive index profiles include those typically used in single mode fibers, see for example G. Keiser, ibid. for specific refractive index profiles.

Active optical fibers having these profiles can be manufactured according to methods known in the art.

In a preferred embodiment, the transverse refractive index profile is a step-index profile, a depressed index profile, a graded index profile, or a polarisation maintaining type index profile such as that used in polarisation maintaining fibers of the types PANDA, BOWTIE, elliptic stress cladding or elliptical core, whereby the transmission advantages of these specific optical fibers and polarisation asymmetry are achieved.

Transverse Photorefractive Dopant Profile

According to the invention, an active optical waveguide to be used in the present method comprises a transverse photorefractive dopant profile having a constant or graded photorefractive dopant concentration within at least one of said guiding, non-guiding and intermediate regions, except that the photorefractive dopant is not located solely in the guiding region.

The transverse photorefractive dopant profile is chosen in any suitable way which modifies the transverse refractive index profile upon transverse illumination of light.

In a preferred embodiment, the transverse photorefractive dopant profile is a single- or multi-step concentration profile or a graded concentration profile.

In a particular preferred embodiment, the transverse refractive index profile and the transverse photorefractive dopant profile have substantially similar shapes, e.g. when germanium (Ge) is used as photorefractive dopant alone or in combination with other dopants.

In this embodiment, the dopant typically has a double function of both affecting, e.g. raising, the refractive index and enhancing the photosensitivity of the waveguide materials, e.g. Ge both increases the refractive index and enhances the photosensitivity. In particular, fewer steps in the manufacturing process are required when the transverse refractive index profile and the transverse photorefractive dopant profile are established by a double-functioning dopant and if no other dopants are used that affect either the refractive index or the photosensitivity of the waveguide material.

Other dopant may be added to obtain the desired index profile. Thus, the transverse index profile and the transverse photorefractive dopant profile may have either dissimilar or similar shapes.

In another preferred embodiment, the intermediate region has the same refractive index as the non-guiding region.

In still another embodiment, the photorefractive dopant profile has a constant or graded photorefractive dopant concentration within the intermediate region, whereby simplified dopant and photorefractive dopant flow characteristics are obtained.

Photorefractive Dopants

As photorefractive dopants can be used any suitable dopants which can be used in the known techniques for optical fiber production, e.g. MCVD and SODOF techniques, and which provide sufficient photosensitivity and index modification in the waveguide material, e.g. silica based glass, said index modification typically being index raising but also index lowering. Thus the desired waveguide properties are obtained by the photorefractive dopant alone or in combination with other codopants.

In a preferred embodiment, the transverse photorefractive dopant profile comprises a dopant selected from the group consisting of boron (B), aluminium (Al), phosphor (P), germanium (Ge), and tin (Sn), or a combination thereof.

In particular germanium (Ge) is known to both raise the refractive index and enhance the photosensitivity of glass.

The photorefractive dopant concentration may be chosen within broad limits with respect to achieving the desired index modification, e.g. in a sufficiently short exposure time to provide a commercially interesting manufacturing process.

In a preferred embodiment, the transverse photorefractive dopant profile in the guiding region has a dopant concentration in the range from 0 to 45 mol-%, preferably from 0 to 35 mol-%, most preferred from 0 to 24 mol-%, particularly from 2 to 12 mol-%, whereby suitable and preferred photosensitivities are obtained.

In a preferred embodiment, the transverse photorefractive dopant profile in the intermediate region has a dopant concentration in the range from 0 to 40 mol-%, preferably from 0 to 30 mol-%, most preferred from 0 to 15 mol-%, particularly from 0.1 to 5 mol-%, whereby suitable and preferred photosensitivities are obtained.

In a preferred embodiment, the transverse photorefractive dopant profile in the non-guiding region has a dopant concentration in the range from 0 to 20 mol-%, preferably from 0 to 5 mol-%, most preferred from 0 to 1 mol-% whereby suitable and preferred photosensitivities are obtained.

In a particularly preferred embodiment, the transverse photorefractive dopant profile in the guiding region is substantially constant having germanium as dopant in a concentration in the range from 0 to 45 mol-%, preferably from 0 to 35 mol-%, most preferred from 0 to 24 mol-%, particularly from 2 to 12 mol-%, whereby both the refractive index and the photosensitivity are controlled by a single dopant.

In another particularly preferred embodiment, the transverse photorefractive dopant profile in the intermediate region is substantially constant having germanium as dopant in a concentration in the range from 0 to 40 mol-%, preferably from 0 to 30 mol-%, most preferred from 0 to 15 mol-%, particularly from 0.1 to 5 mol-%.

Transverse Illumination of Light

The transverse illumination of light can be performed with any suitable light having a wavelength which allows photoreaction between the waveguide material, and/or photorefractive dopant to modify the refractive index.

In a preferred embodiment, the transverse illumination light has wavelength in the UV range from 50 to 550 nm, preferably from 150 to 380 nm, most preferred from 190 to 270 nm, whereby particularly high photosensitivities are obtained for many dopants.

Further, in a preferred embodiment an excimer laser is used as UV source. The laser preferably operates at either 193 nm using ArF or at 248 nm using KrF.

The fluence of the transverse illumination of light is generally chosen to be sufficient to selectively suppress the propagation of light in the light guiding modes having different polarisations so that the propagation of light in one mode is less suppressed than the propagation of light in the other mode(s).

In a preferred embodiment, the exposure lasts for a period of time corresponding to application of a fluence to the active optical waveguide in the range from 1 J/cm$^2$ to 10 MJ/cm$^2$, preferably from 10 J/cm$^2$ to 1 MJ/cm$^2$, most preferred from 100 J/cm$^2$ to 10 kJ/cm$^2$.

Below 1 J/cm$^2$ the produced polarisation asymmetry is simply too weak, and above 10 MJ/cm$^2$ saturation sets in and causes too much damage to the waveguide material, e.g. glass.

Active Dopant

The active optical waveguide may comprise nay suitable active dopant known in art which dopant provides a gain in a suitable transmission window of the active optical waveguide.

The $^4I_{13/2}$ to $^4I_{15/2}$ transition in $Er^{24}$ is well known to produce gain in the third telecommunications window, 1530 nm–1565 nm. La and Yb may both be used as co-dopants in the Er-doped material to reduce the likewise well known deleterious effects of Er-ion clustering. Yb may further be used to enhance the pump-to-signal photon conversion efficiency via alternative Yb-absorption bands and ion-ion interaction. This may have the useful effect of increasing the slope efficiency of an Er-doped fiber DFB laser produced using the methods of the invention. Both Nd, Yb, Ho, Tm and Pr may be used to produce fiber lasers in other wavelength regions.

In a preferred embodiment, the active optical waveguide comprises a silica based material doped with an active dopant selected from the rare earth elements, in particular selected from the group consisting of La, Ce, Pr, Nd, Gd, Dy, Ho, Er, Tm, Yb.

Polarisation Asymmetric Active Optical Waveguide

The present invention also relates to a polarisation asymmetric active optical waveguide obtainable by the method which may be used to produce polarisation single mode fiber lasers. It may also have other applications, e.g. compensation of polarisation dependent loss in waveguides.

Single Polarisation Mode Optical Waveguide Laser

The present invention also relates to a method of producing a single polarisation mode optical waveguide laser having a pump light source and a distributed feedback or distributed Bragg reflector comprising the steps of:

(a) producing a polarisation asymmetric active optical waveguide according to the invention;

(b) incorporating one or more Bragg gratings in the guiding region, the intermediate region, the non-guiding region, or a combination of these, of said polarisation asymmetric active optical waveguide, optionally simultaneously with the production of the polarisation asymmetric active optical waveguide; and (c) directing pump light from said pump light source to said polarisation asymmetric active optical waveguide having incorporated said Bragg gratings.

In a particularly preferred embodiment, the Bragg grating is incorporated in the guiding region, the intermediate region, the non-guiding region, or a combination of these, by interferometrically mixing the transverse illumination light into an interferometric pattern illuminating the active optical waveguide, preferably through a phase mask.

The phasemask technique provides a particularly simple and fast method for imprinting a grating in a waveguide using UV light exposure; extensive alignment procedures are avoided. More general interferometric methods of mixing light involve more elaborate alignment, but on the other hand are more flexible in terms of choice of grating period.

In another preferred embodiment, the transverse illumination light is inhomogeneous to provide an illumination at the center part of the Bragg grating which is different from that of the other parts of the Bragg grating, whereby it is obtained that a phase shift may be induced.

By illuminating part of the waveguide with a different fluence, a phase shift of $\pi/2$ may be induced. This is necessary to obtain good single mode performance as is well known from general DFB laser theory.

Accordingly, in still another embodiment, the center part of the Bragg grating is illuminated with another transverse illumination light than that illuminating the other parts of the Bragg grating, whereby different wavelengths of the illuminating lights can be used.

By stretching the fiber during illumination the grating period of the resulting device is tuned to a shorter wavelength. This makes particularly the phasemask technique more flexible, reducing the number of phasemasks necessary to cover a certain wavelength range.

In an embodiment the optical waveguide is a polarisation maintaining optical fiber.

The present invention also relates to a single polarisation mode optical waveguide laser having a pump light source and a distributed feedback or distributed Bragg reflector obtainable by the method according to the invention.

Multi-wavelength Single Polarisation Mode Optical Waveguide Laser

The present invention also relates to a method of producing a multi-wavelength single polarisation mode optical waveguide laser having a pump light source and a distributed feedback comprising the steps of:

(a) producing two or more polarisation asymmetric active optical waveguides according to the invention, including such waveguides for which the photorefractive dopant is located solely in the guiding region; and (b) incorporating one or more Bragg gratings in the guiding region, the intermediate region, the non-guiding region, or a combination of these, of said polarisation asymmetric active optical waveguides, according to the invention, optionally simultaneously with the production of the polarisation asymmetric active optical waveguide; and (c) directing pump light from said pump light source to said polarisation asymmetric active optical waveguides having incorporated said Bragg gratings.

A multi-wavelength single polarisation mode optical waveguide laser can be fabricated by concatenating a number of single-wavelength DFB lasers. These may use either the same pump or more pump sources. One advantage of this design is that the laser cavities (the DFB grating fibers) may be placed on the same thermal load. This reduces the inter-channel wavelength drift with temperature. Due to the very low temperature sensitivity of the gratings (0.01 nm/K) the absolute position of the wavelength grid is well defined. These sources are ideal for application in wavelength division multiplexed optical communication systems, and such a laser obtainable by the method.

In a preferred embodiment, the two or more polarisation asymmetric active optical waveguides having incorporated one or more Bragg gratings in the guiding region, the intermediate region, the non-guiding region, or a combination of these, are produced sequentially in the same active optical waveguide, or are produced by splicing together two or more single polarisation mode optical waveguides lasers according to the invention.

In a further preferred embodiment, the two or more polarisation asymmetric active optical waveguides having incorporated said Bragg gratings consist of 1 to 64 such waveguides, preferably 2, 4, 8, 16, 32, or 64 such waveguides.

The invention also relates to a multi-wavelength single polarisation mode optical waveguide laser having a pump light source and a distributed feedback obtainable by the method according to the invention.

Uses of a Polarisation Asymmetric Active Optical Waveguide

The present invention also relates to uses of the polarisation asymmetric active optical waveguide, the single polarisation mode optical waveguide laser and the multi-wavelength single polarisation mode optical waveguide according to the invention in a telecommunication network, in optical spectroscopy apparatus, in a sensor, or in absolute calibrated laser light sources locked to an absorption line of an absorption gas, preferably acetylene-13 ($^{13}C_2H_2$) or krypton.

Use in telecommunication networks. The laser sources according to the invention have the particular advantage that they have a well defined absolute wavelength. This makes them useful as sources in wavelength division multiplexed optical communication systems or in coherent optical communication systems as local oscillators. In absolute wavelength calibrated laser source, both acetylene 13 ($^{13}C_2H_2$) and krypton have strong absorption lines within the third telecommunications window. These gases are therefore good candidates to be used for frequency stabilisation of fiber DFB lasers operating in that window. For sensor applications stable, narrowband laser sources are required. This applies also to spectroscopy.

Similarly for multi-wavelength systems, including wavelength division multiplexed optical communication systems.

Definition of Expressions

Within the present context it is intended that the expression "light guiding modes having different polarisation" means light guiding modes within the theory of light propagation in optical waveguides which modes are characterized by their complete field distribution, e.g. comprising transverse and/or longitudinal mode numbers and polarisations.

Thus, a mode is not considered to comprise two different polarisations, but one mode comprises one polarisation.

The expression "optical waveguide" is intended to comprise both planar and fiber optical waveguides.

3. BRIEF DESCRIPTION OF THE DRAWINGS

In the following, the invention is further disclosed with detailed description of preferred embodiments, reference being made to the drawings in which FIGS. 1A and 1B show sketches of a cross-section and a longitudinal cross-section, respectively, of a preferred embodiment of the method of producing an active optical waveguide having asymmetric polarisation according to the invention, here an active optical fiber;

FIGS. 3A and 3B show sketches of the cross-section of the active optical fiber in FIG. 1A and its transverse photorefractive dopant profile;

4. DETAILED DESCRIPTION

FIGS. 1A and 1B show sketches of a cross-section and a longitudinal cross-section, respectively, of a preferred embodiment of the method of producing an active optical waveguide having asymmetric polarisation according to the invention.

An active optical waveguide, in a preferred embodiment an active optical fiber based on silica, 10 comprises a 4 µm diameter guiding region 11 containing an active dopant, in this embodiment erbium, a non-guiding region 12 of 31–37 µm thickness surrounding the guiding region, and an intermediate region 13 of 1–7 µm thickness between said guiding and non-guiding regions. The active optical fiber has a numerical aperture of about 0.27 and after exposure, in this embodiment UV light from a KrF excimer laser with 248 nm light, exhibits light guiding modes having different polarisations as exemplified by the two orthogonal arrows in FIG. 1A.

The guiding region further contains photorefractive and index raising dopants Ge and Al. The intermediate region is doped with photorefractive dopant Ge.

Figure 2A:
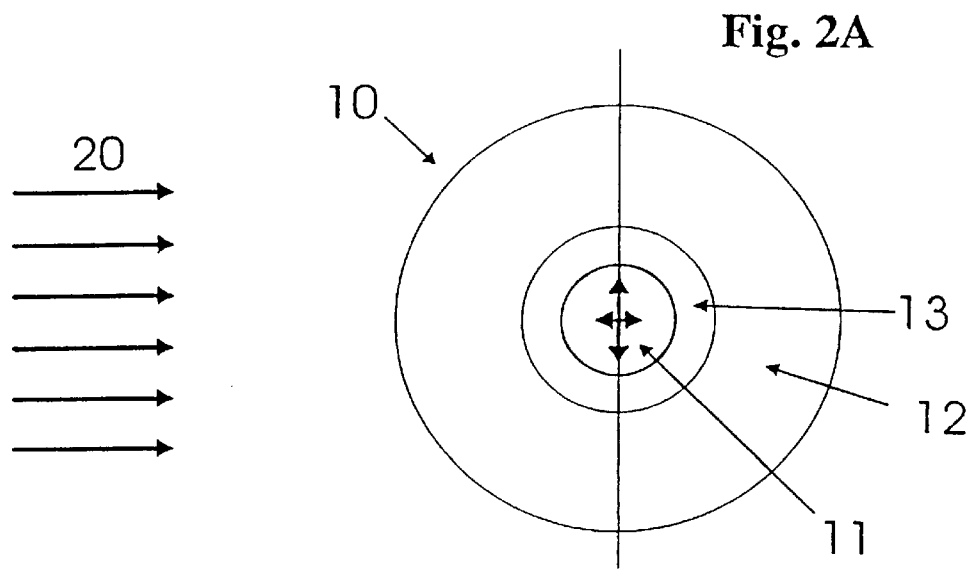
FIGS. 2A and 2B show sketches of the cross-section of the active optical fiber in FIG. 1A and its transverse refractive index profile before and after exposure to a transverse illumination of light.
Figure 2B:
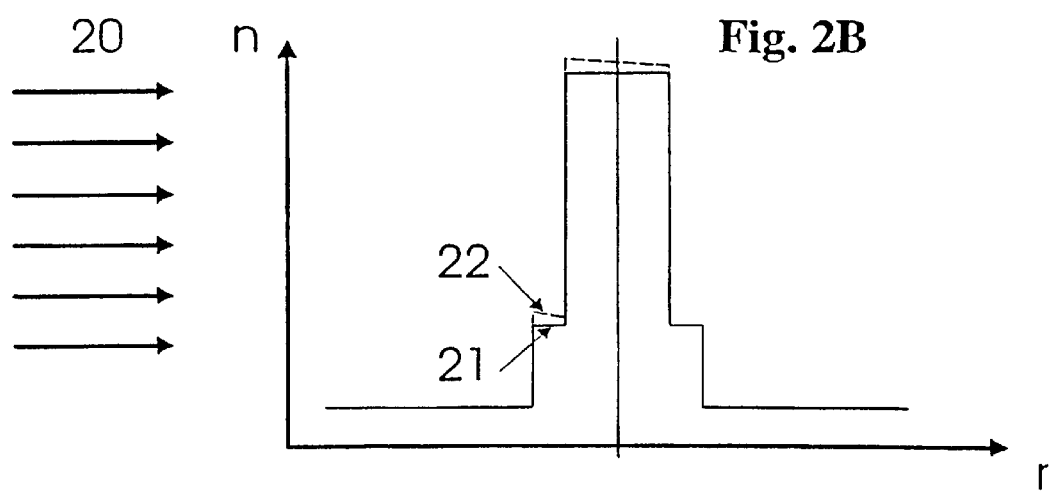

FIGS. 2A and 2B show the cross-section of the active optical fiber in FIG. 1A and its transverse refractive index profile 21 before exposure, expressed as the refractive index, n versus the radial distance, r, and the modified transverse refractive index profile 22 after exposure of at least a part 10a, 10b of the active optical waveguide to the transverse illumination of light 20, in this embodiment UV light from a KrF excimer laser with 248 nm light.

It is seen that the modified transverse refractive index profile has become significantly more elevated in the part of the guiding and intermediate regions proximal to the illuminating light than the part distal thereto; the latter distal parts of the non-modified and modified transverse refractive index profiles being approximately coinciding in this embodiment.

The resultant asymmetric transverse refractive index profile 22 of this embodiment ensures the polarisation asymmetry of the active optical waveguide.

The modified transverse refractive index profile is predominantly achieved, in this embodiment, by modifying the transverse refractive index by reacting the transverse illuminating light having a transverse decreasing intensity (due to absorption primarily in the core) through the waveguide 10 with the photorefractive dopant, in this embodiment germanium (Ge) having a transverse photorefractive dopant profile 31 as shown in FIG. 3B. The cross-section of the waveguide is shown in FIG. 3A.

Figure 4A:
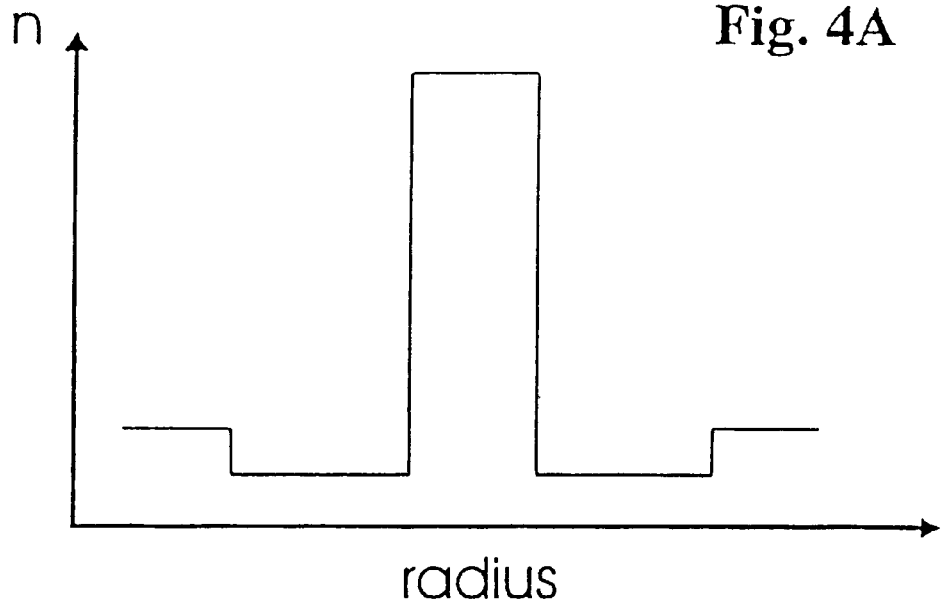
FIGS. 4A and 4B show sketches of other transverse index profiles before and after exposure to a transverse illumination of light.
Figure 4B:
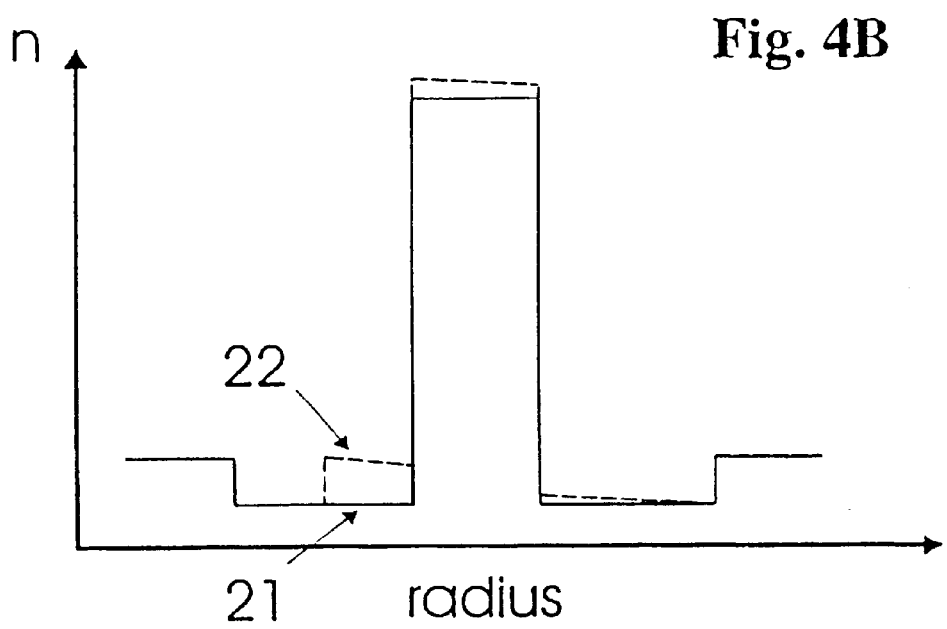

Other preferred embodiments of the transverse refractive index profile before illumination and the modified transverse refractive index profile after illumination are shown in FIGS. 4A and 4B.

In such an embodiment, an active optical fiber based on silica comprises a 4 µm diameter guiding region. The guiding region is doped with about 18 mol-% Ge as photorefractive dopant and about 8 mol-% Al. The intermediate region had a thickness of approximately 4.5 µm and is doped about 1 mol-% Ge and sufficient amount of F to decrease the refractive index to about $-2*10^{-2}$ compared to silica. The non-guiding region partly doped with P and F has the same index of refraction as the intermediate region and it has the refractive index of silica in the undoped region. The active optical fiber has a numerical aperture of about 0.27. The erbium concentration in the guiding region is chosen to give an attenuation of about 22 dB/m at 1530 nm. This active optical fiber corresponds to the one available under the lot no. 930810 from Lucent Technologies Denmark A/S (former Lycom A/S), Brondby, Denmark.

The reaction between the illuminating light and the photorefractive dopant is allowed to proceed until the transverse refractive index has become sufficiently modified to selectively suppress the propagation of light in the light guiding modes having different polarisations so that the propagation of light in one mode is less suppressed than the propagation of light in the other mode(s).

The occurrence of this situation can be monitored by methods known in the art. Here a Fabry-Perot interferometer with a free spectral range of 7.5 GHz and a finesse of 75 was used to empirically correlate the exposure and the suppression of light of different polarisations of the exposed active optical fiber, said exposed active optical fiber being equipped with a Bragg grating and mounted in a fiber optical laser set up with distributed feedback.

Figure 5:
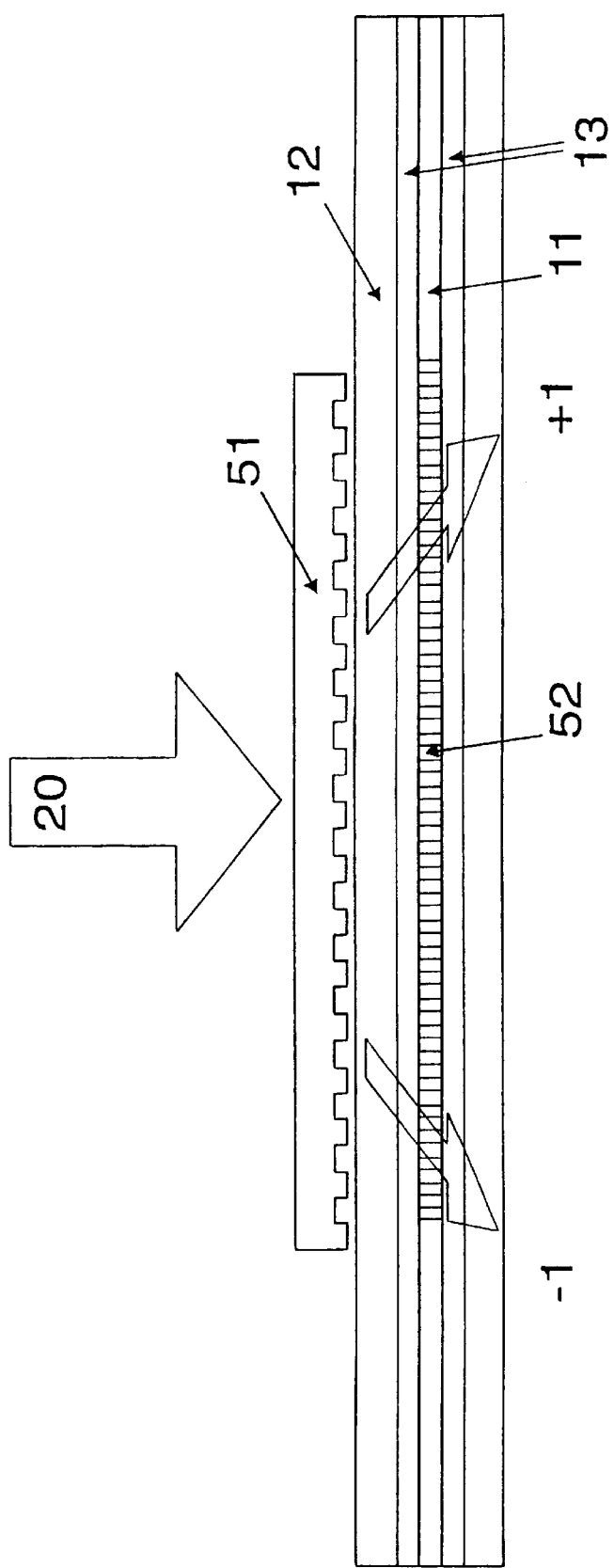
FIG. 5 shows a sketch of a longitudinal cross-section of a preferred embodiment of an active optical fiber simultaneously having a Bragg grating written into the guiding region thereof.

FIG. 5 illustrates the method of UV imprinting a grating in a waveguide using the phasemask technique. In the figure an active optical fiber as described in the invention is illustrated with a guiding region 11, a non-guiding region 12, and an intermediate layer 13. The UV light 20, in this embodiment produced by a KrF excimer laser operating at 248 nm, passes through a phasemask 51 (supplied by QPS, S/N 6035Y-7-1071-50-3). The phasemask 51 is 5 cm long and has a 1071 nm spacing and a zero order suppression better than 5%, hence light diffracts predominantly in the 1st and −1st order. The diffracted light interferes in the guiding and intermediate regions to produce a grating 52 with a period determined by the grating period of the phasemask 51 and by the effective index of the waveguide.

Figure 6A:
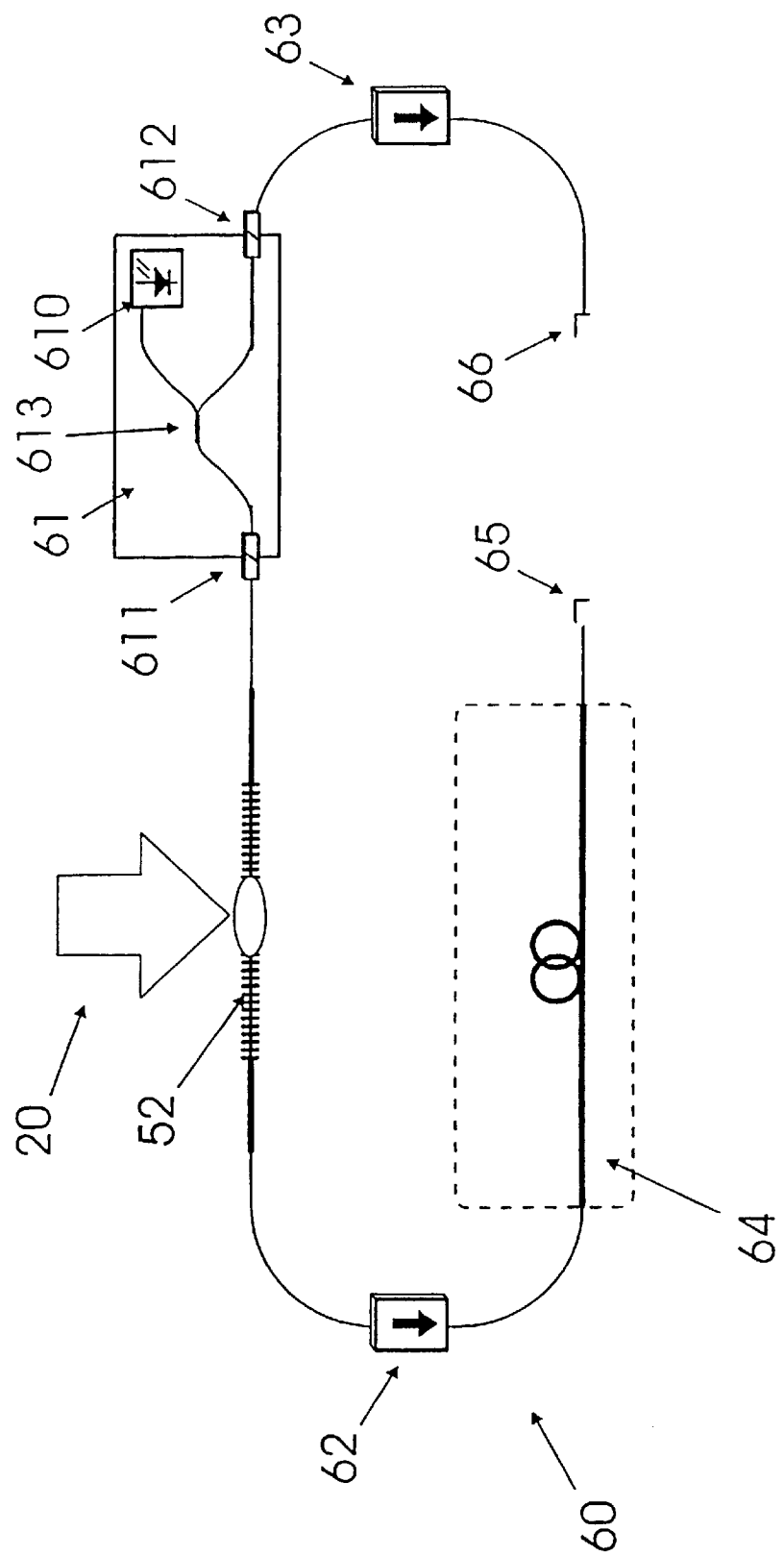
FIGS. 6A and 6B show sketches of preferred embodiments of a single polarisation mode and a five-wavelength single polarisation mode, respectively, optical fiber laser having a pump light source and a distributed feedback comprising one or more of the active optical fibers with Bragg gratings shown in FIG. 5.

FIG. 6A shows a preferred embodiment of a single polarisation mode optical fiber DFB laser 60. In this embodiment a 1475 nm/60 mW pump laser 610 is multiplexed with the light at around 1550 nm from the single polarisation mode optical fiber DFB laser using a fiber WDM 613. In this embodiment angled connectors 611, 612 are used at both ends of the pump section 61 to reduce internal reflections. Fiber pigtailed optical isolators 62, 63 are spliced at both ends of the complete fiber DFB laser module to reduce the effect of external reflections. As illustrated in FIG. 5, UV light from a KrF excimer laser operating at 248 nm is used to write the grating 52 in the erbium doped fiber and also to selectively increase the refractive index in the center part of the grating to induce the π/2 phaseshift necessary for single longitudinal mode operation. The surplus pump light propagating in the fiber along with light from the fiber DFB laser may optionally be used to pump another section of erbium doped fiber to act as a booster amplifier 64. The ends of the device are fitted with connectors 65, 66 to easily interface to other optical systems.

Figure 6B:
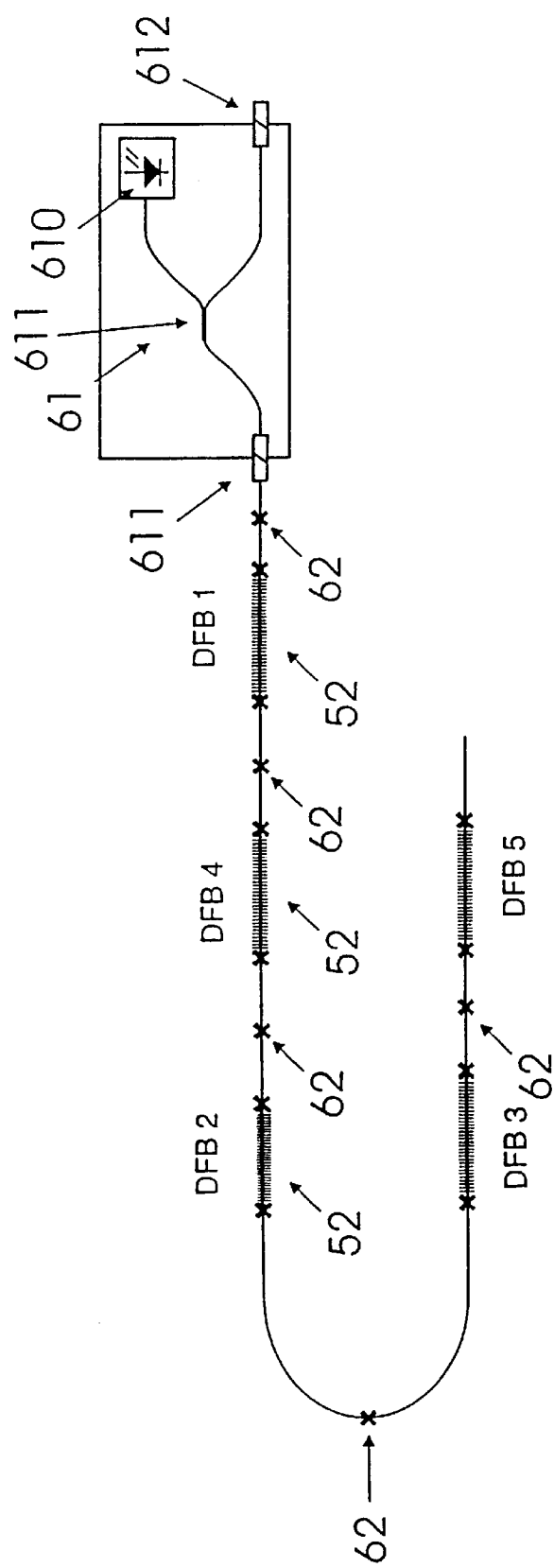

FIG. 6B shows a preferred embodiment of a five wavelength single polarisation mode optical fiber DFB laser. In this embodiment one single 1480 nm/60 mW pump laser 610 is used to pump five sections of single grating 52 erbium doped fiber. The pump light at 1480 nm is multiplexed with the light at around 1550 nm from the single polarisation mode optical fiber DFB lasers using a fiber WDM 613. In this embodiment angled connectors 611, 612 are used at both ends of the pump section 61 to reduce internal reflections. The sections of single grating 52 erbium doped fiber are spliced 62 to each other to form a linear chain five wavelength single polarisation mode optical fiber DFB laser.

Figure 7A:
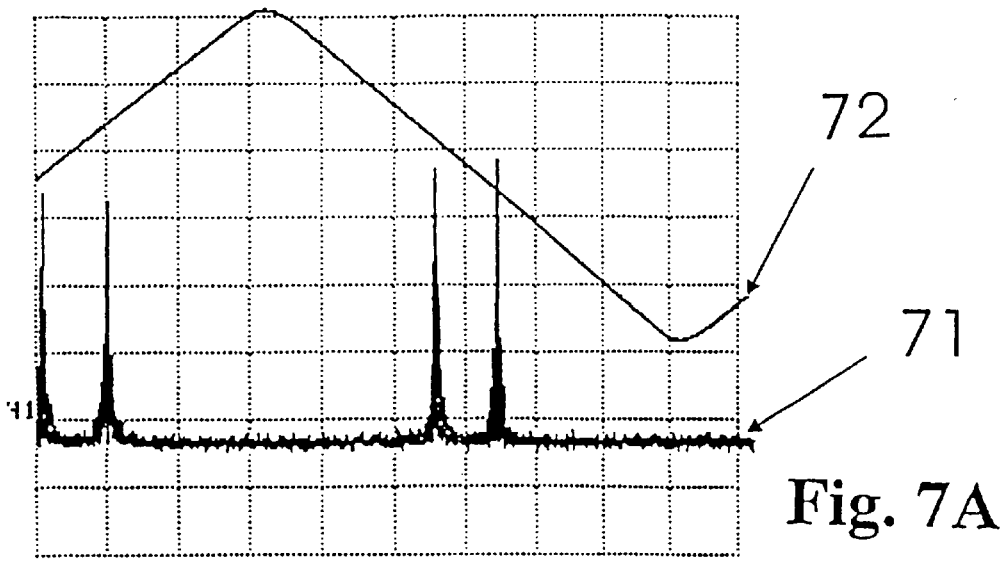
FIGS. 7A and 7B show measured Fabry-Perot scannings of normalized laser power output versus frequency of an active optical fiber according to prior art and a preferred embodiment of an active optical fiber according to the invention.
Figure 7B:
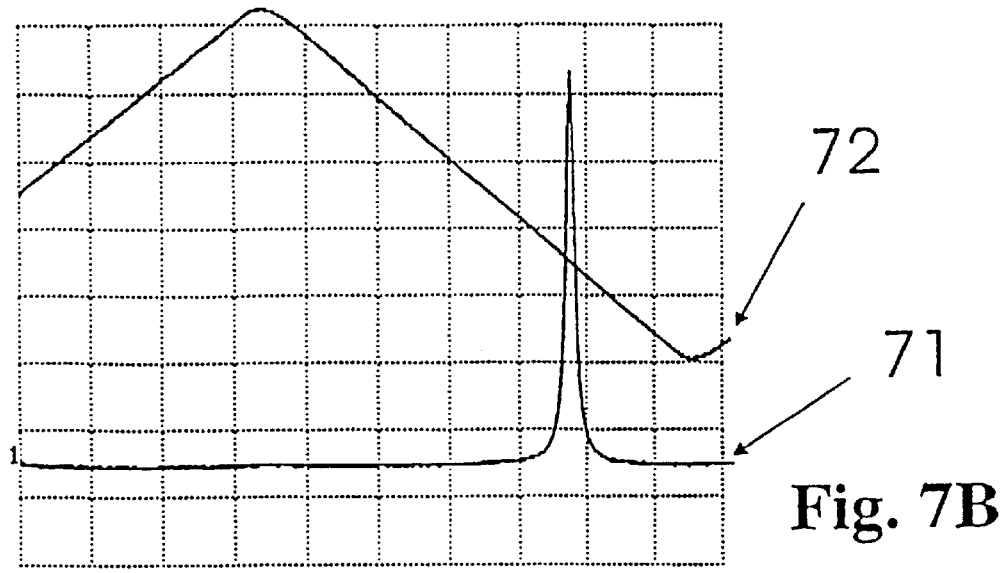

FIGS. 7A and 7B show frequency scans of the output from an optical fiber DFB laser. The laser light was passed through a scanning Fabry-Perot interferometer with a free spectral range of 7.5 GHz and a finesse of 75. The scale of the vertical axis is arbitrary while the scale of the abscissa is determined roughly from the extent of the linear ramp voltage 72 which corresponds approximately to the free spectral range of 7.5 GHz. The frequency scan 71 of FIG. 7A illustrates the double mode structure of the laser which is obtained if the optical fiber does not have photorefractive dopant in both the guiding region and the intermediate region. The frequency scan 71 of FIG. 7B illustrates how a single polarisation mode laser is obtained using an active optical fiber according to the invention. Single polarisation mode operation is secured due to the formation of polarisation asymmetry in the fiber during grating formation according to the invention.

Figure 8:
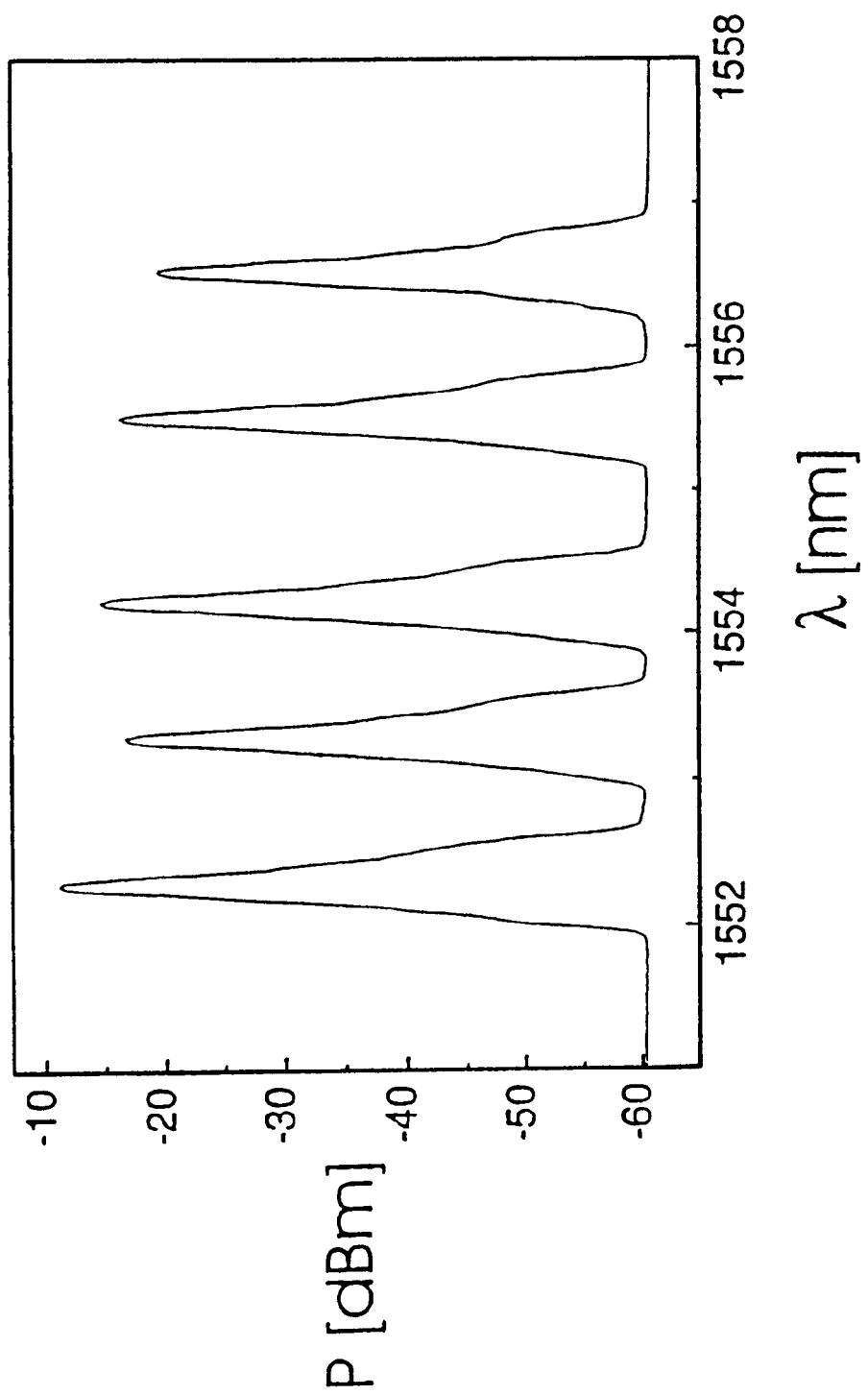
FIG. 8 shows a measured scanning of power output versus wavelength of a preferred embodiment of the five-wavelength single mode optical fiber laser shown in FIG. 6B.

The output spectrum from the five wavelength single polarisation mode optical fiber DFB laser is illustrated in FIG. 8. The spectrum is obtained using an ANDO model AQ-6315A double grating optical spectrum analyzer. The peak wavelength separation is 1 nm±0.1 nm and the laser power varies between −19 and −11 dBm. This variation is due to the relatively low pump power (60 mW at 1480 nm) and to loss of pump power in non-optimal splices 62 between the individual laser sections, FIG. 6B. The signal-to-noise ratio of the laser channels is around 45 dB.

Figure 9:
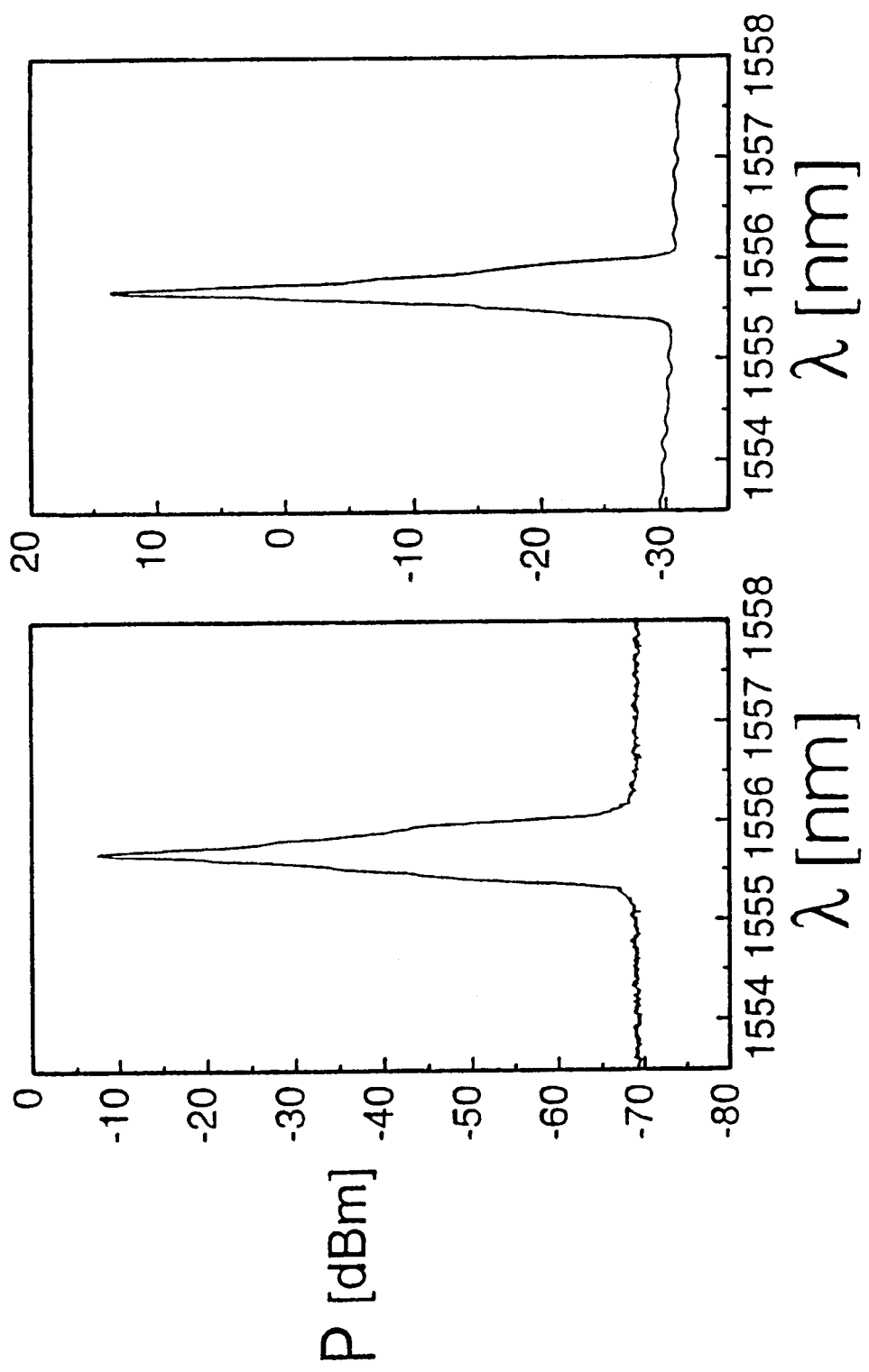
FIGS. 9A and 9B show the laser power outputs versus wavelength at the peak wavelength of 1555.6 nm of a preferred single polarisation mode optical fiber laser as shown in FIG. 6A, and of said laser further equipped with a commercial booster, respectively.

The output spectrum from the single wavelength single polarisation mode optical fiber DFB laser is illustrated in FIG. 9A and FIG. 9B. The spectra are obtained using an ANDO model AQ-6315A double grating optical spectrum analyzer. The optical power is −8.2 dBm in the unamplified configuration, FIG. 9A, and +13.4 dBm when amplified with an erbium doped fiber booster amplifier, FIG. 9B. The signal-to-noise ratio of the unamplified laser, FIG. 9A, is 61 dB, while that of the amplified laser degrades to 44 dB, FIG. 9B.

Figure 10:
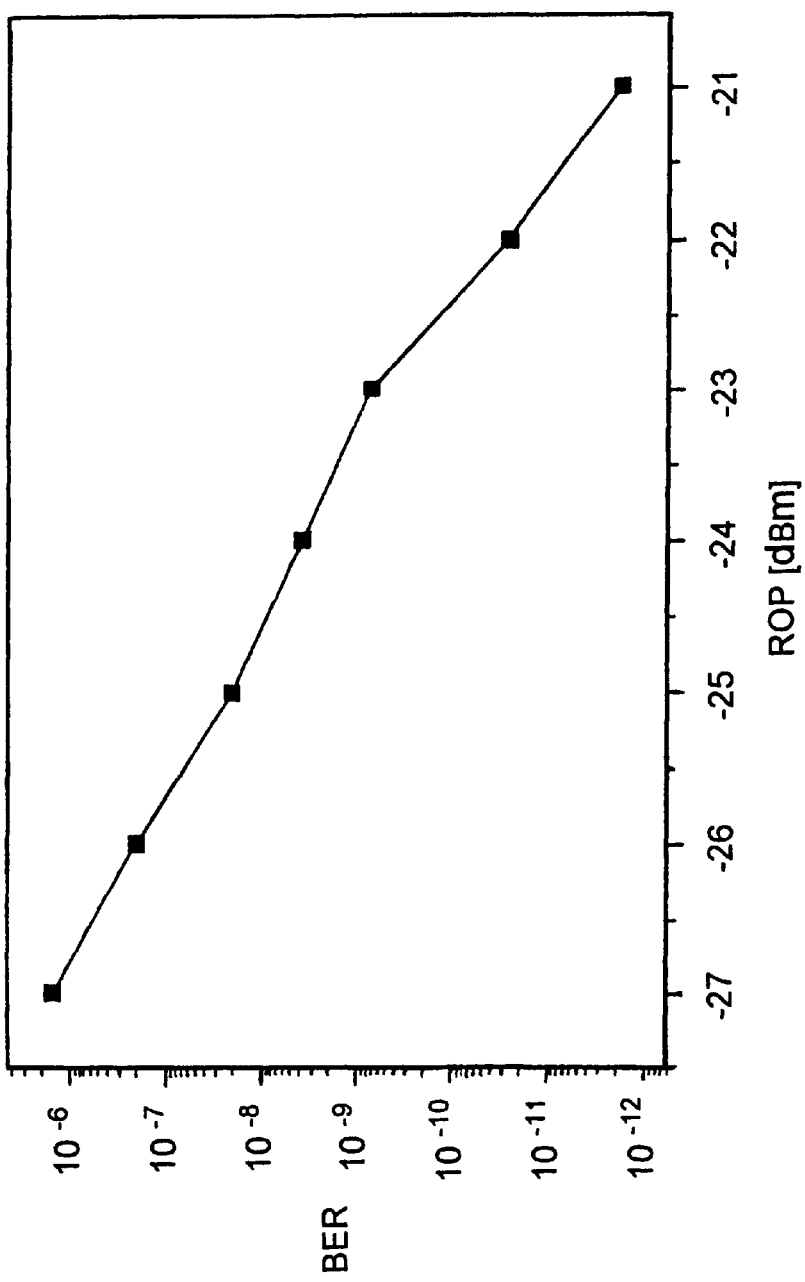
FIG. 10 shows the bit error rate (BER) versus received optical power (ROP) of a preferred single polarisation mode optical fiber laser as shown in FIG. 6A.

The single wavelength single polarisation mode optical fiber DFB laser was tested in a 10 Gbit/s transmission experiment. The laser was externally modulated using a Mach-Zender modulator. The signal was transmitted over 49.5 km of non-dispersion shifted standard telecommunication fiber with a total loss of 10 dB. The measured curve for bit error rate (BER) versus received optical power (ROP) is shown in FIG. 10.

Figure 11:
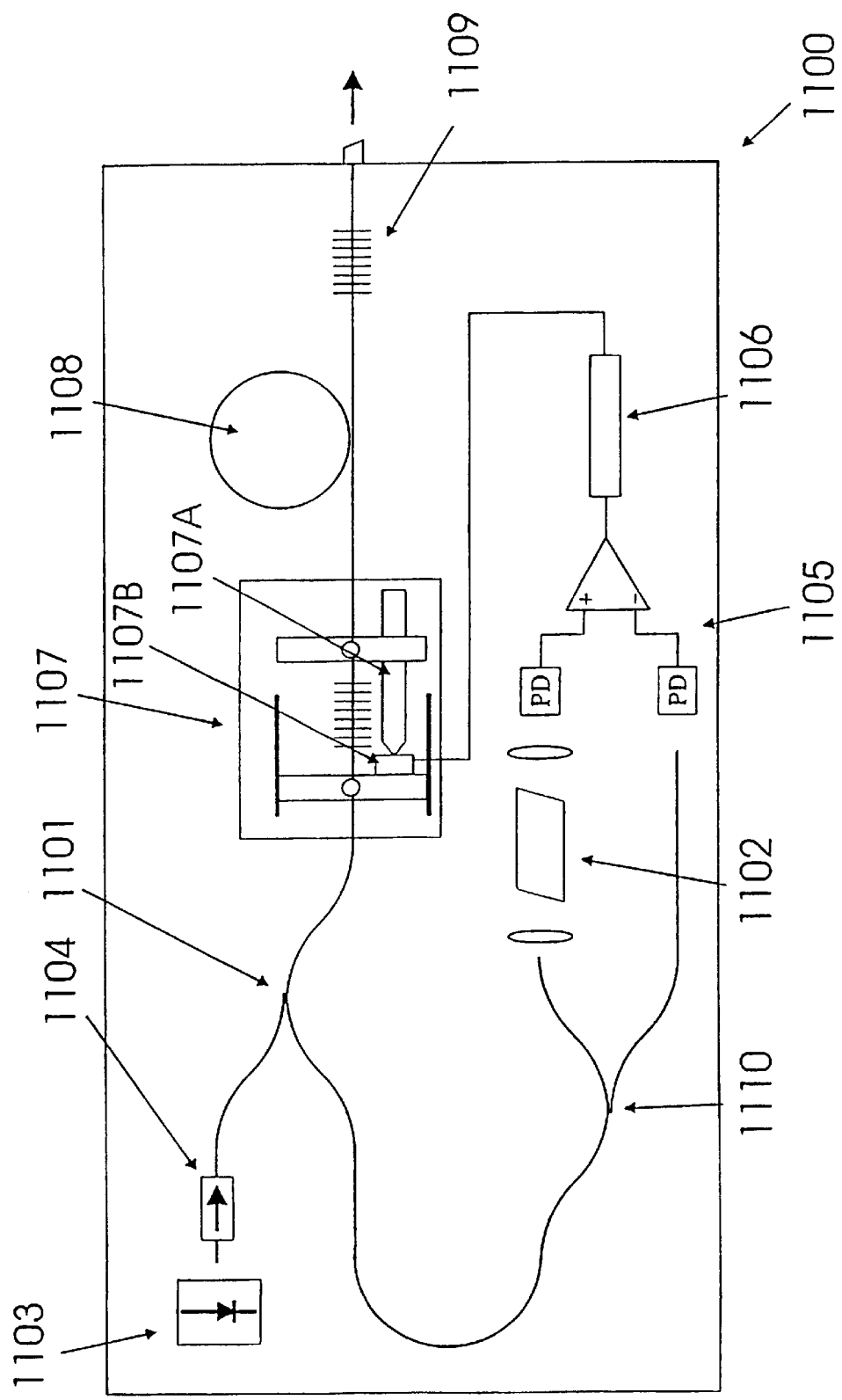
FIG. 11 shows a sketch of a preferred embodiment of an absolute calibrated laser light source.
Figure 12:
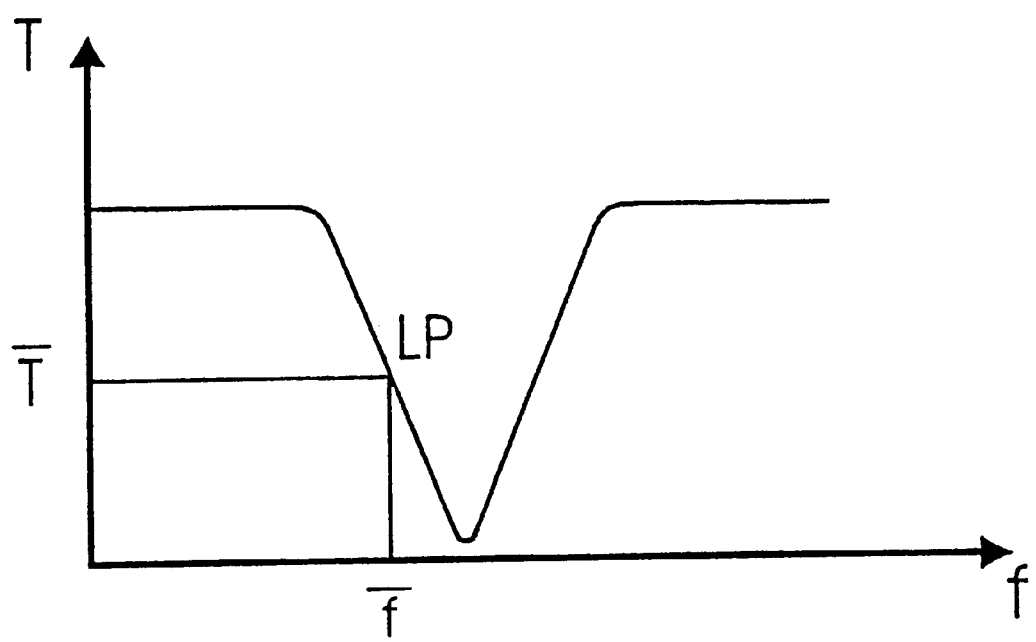
FIG. 12 shows a graph of transmission through the gas cell versus frequency of the absolute calibrated laser light source shown in FIG. 11 indicating the locking point (LP).

FIG. 11 shows a preferred embodiment of an absolute wavelength calibrated laser light source 1100 based on a single wavelength single polarisation mode optical fiber DFB laser as described in the invention. The laser configuration is basically the same as illustrated in FIG. 6A; a pump laser at 1480 nm 1103 is multiplexed with the DFB laser light using a fiber WDM 1101. An isolator 1104 is placed after the pump for stability. The surplus pump light propagating in the fiber is used to pump another section of erbium doped fiber to act as a booster amplifier 1108. The still remaining pump light is further reflected back into the booster amplifier section 1108 using a UV written pump reflector 1109. The main difference to the laser described in FIG. 6A is that the active part of the laser with the Bragg grating is fixed on a translation mount 1107 such that it is possible to stretch the fiber. This can be accomplished either by turning a micrometer screw 1107A or by tuning a piezo 1107B. This way the peak wavelength of the single wavelength single polarisation mode optical fiber DFB laser is tuned. The absolute value of the laser wavelength is established through controlled absorption in a gas cell 1102 containing a gas with strong absorption lines in the gain band of the laser material. For Er-doped fiber lasers this could be acetylene-13 ($^{13}C_2H_2$) or krypton (Kr). While the laser is operating the peak wavelength of the laser is tuned manually using the micrometer screw thus scanning across the absorption lines of the gas in the gas cell. As illustrated in FIG. 12 (transmission (T) through gas cell 1102 versus frequency (f)), the laser is tuned to a position, the locking point (LP), that coincides with the step part of a strong absorption line. The portion of the laser light going in one direction is split using a fiber-optic power divider 1110. One part is passed through the gas cell 1102 and directed to a photo diode (PD), the other part is directed directly to another photodiode (PD). The signals from the two photo diodes are compared in a differential amplifier 1105. If the laser drifts from its set wavelength position, the output from the differential amplifier changes. A servo loop 1106 now provides for the necessary feedback to tune the laser back to its set value by adjusting the voltage that controls the piezo stack; this controls the stretching of the fiber DFB laser and hence the laser wavelength.

5. EXAMPLES

Example 1

Polarisation Asymmetric Active Optical Fiber

An example of an embodiment of an active optical waveguide having asymmetric polarisation according to the invention was produced in the following way. An optical fiber with a transverse refractive index profile and transverse photorefractive dopant profile as shown in FIGS. 4A and 3B, respectively, was provided (lot no. 930810, Lucent Technologies Denmark A/S (former Lycom A/S), Brondby, Denmark). 5 cm of this optical fiber was placed in a groove and illuminated at 248 nm using a KrF excimer laser. The fiber was illuminated with a total fluence of about 1.2 kJ/cm$^2$. When illuminated under the same conditions but through a 5 cm long phase mask, Bragg gratings were photoinduced with a peak reflectivity of 99%. Polarisation asymmetry was proved by employing such a fiber in a DFB laser configuration, where further the central portion of the illuminated section was illuminated separately to induce a π/2 phase shift as required for DFB lasers to operate in a single longitudinal mode. This laser operated also in a single polarisation mode illustrating the polarisation asymmetry of the waveguide. An induced birefringence of $1.5*10^{-5}$ to $3*10^{-5}$ was measured by use of a scanning Fabry-Perot interferometer on a dual-polarisation mode DFB fiber laser; said dual-polarisation mode operation being obtained immediately after single-polarisation mode operation was achieved during the illumination with said KrF excimer laser.

Example 2

DFB Optical Fiber Laser

In this experiment a 5 cm of $Er^{3+}$:Ge:Al codoped silica fiber (lot no. 930810 supplied by Lucent Technologies Denmark A/S (former Lycom A/S), Brondby, Denmark) was spliced to standard fiber pigtails equipped with angled connectors.

Bragg gratings were photoinduced using a KrF excimer laser illuminating the fiber with 248 nm light through a 5 cm long phasemask having 1071 nm spacing and zero-order suppression better than 5% (lot no. 6035Y-7-1071-50-3 supplied by QPS, Canada). The induced grating was 4.6 cm long and has a peak reflectivity of 99% of 1555.6 nm. A phase shift was induced in the central part of the grating by additional UV-exposure. The grating was pumped by a semiconductor laser giving 60 mW output around 1475 nm as shown in FIG. 6A.

The lasing was monitored using an optical spectrum analyzer. A scanning Fabry Perot interferometer was used to verify single mode operation. Single mode operation without mode hopping was observed continuously from room temperature up to 200° C. and also at −196° C.

The laser has a peak wavelength of 1555.6 nm and a signal to noise ratio of 61 dB, measured with a 0.05 nm resolution as shown in FIG. 9A. The signal power was 150 μW with 60 mW pumping. When amplifying the laser with a commercially available booster amplifier a signal power of 22 mW was achieved with a signal to noise ratio of 44 dB as shown in FIG. 9B.

To prove the long term stability of the laser a transmission experiment at a bit rate of 10 Gbit/s was carried out. The laser was put in a block of aluminum which was mounted on an optical table. Further temperature stabilization was not necessary as the wavelength drift due to temperature is as low as 0.01 nm/K. The laser was modulated with a $2^{31}-1$ non-return zero pseudo random bit sequence using a Mach Zehnder modulator controlled by a 10 Gbit/s transmission error test set. The signal was transmitted over 49.5 km of standard telecommunication fiber with a total loss of 10 dB. The bit error rate curve was measured as shown in FIG. 10 and error free operation was observed during a measurement time of one hour.

This example has demonstrated that DFB fiber lasers in preferred embodiments according to the present invention are an attractive alternative as sources in telecommunication systems. The lasers show excellent long term stability with very high signal to noise ratio and a reasonable output power, combined with exceptional temperature stability and inherent fiber compatibility.

Example 3

Five Wavelength DFB Optical Fiber Laser

Each laser 52 (see FIG. 6B) was fabricated individually using 5 cm erbium doped fiber (lot no. 930810, supplied by Lucent Technologies Denmark A/S (former Lycom A/S), Brøndby, Denmark) spliced to dispersion shifted fibers and equipped with standard pigtails using angled connectors 62. The erbium doped fiber has a core, a cladding and an intermediate region and a dopant concentration of $1.5\times10^{25}$ atoms m$^{-3}$ in the core which has a diameter of 4 μm and a numerical aperture of 0.27. The fiber has a photorefractive dopant profile comprising germanium in the intermediate region. The Bragg gratings and polarisation asymmetry are photoinduced simultaneously using a KrF excimer laser with 284 nm light illuminating a 5 cm long phasemask having 1071 nm spacing and zero-order suppression better than 5% (lot no. 6035Y-7-1071-50-3 supplied by QPS, Canada).

The fluence on the fiber is around 0.4 J/cm² per pulse. After around 3000 pulses the 4.2 cm long gratings had a peak reflectivity of 99% corresponding to a grating strength κL of around three.

A phase shift was then induced in the central part of the grating by additional UV exposure. To ensure a proper phase shift each laser was pumped with a 1480 nm semiconductor laser while the phase shift was induced. The lasing was monitored on a spectrum analyzer and a scanning Fabry Perot interferometer with a free spectral range of 7.5 GHz.

The lasers show high temperature stability. Longitudinal and polarization single mode operation without mode hopping has been verified continuously from room temperature up to 200° C. as well as at −196° C.

All lasers are written with a single phasemask. The wavelength is determined by the applied stress on the fiber during the writing process thereby changing the grating period when releasing the fiber. A wavelength change of about 5 nm can be achieved without breaking the fiber. The wavelength reproducibility of our current setup is around 0.2 nm.

After UV writing the lasers, the angled pigtails are cut off and the lasers are spliced together and pumped with the same 60 mW semiconductor laser operating at 1480 nm, thereby forming a multiwavelength source. The peak wavelength separation is 1 nm±0.1 nm. FIG. 8 shows the output from the five lasers. The difference in lasing power is mainly due to relatively low pump power in combination with not fully optimized splicing.

This example has demonstrated a stable five wavelength optical fiber DFB laser suitable for wavelength division multiplexing (WDM) systems. The design principle is easily scaleable to 8 wavelength or more. The position of the individual wavelength can be placed more precisely by using a customized phasemask for each desired wavelength.

Example 4

An Absolute Wavelength Standard Based on an Optical Fiber DFB Laser and Acetylene-13

In an embodiment (see FIG. 11) of an absolute frequency/wavelength standard 1100 based on a single mode and polarisation single mode optical fiber laser 1103, 1104, 1107A according to the invention, the laser wavelength is tuned via stretching of the fiber grating (using a piezo stack 1107B) and absorption of the laser light by a well defined absorption line of a gas in a gas cell 1102 with strong absorption lines within the gain spectrum of the laser. In the present example, erbium doped fiber lasers and acetylene-13, i.e. carbon enriched with carbon-13, were used. While the laser is operating, the laser wavelength may be tuned manually using a micrometer screw 1107C thus scanning across the absorption lines of the gas used. The laser is tuned to a frequency position I that coincides with the steep part of the strong P(9) absorption line at 1537.66 nm of acetylene-13. The portion of the laser light going in one direction is split using a fiberoptic power divider 1110. One part is passed through the gas and directed to a photo diode PD, the other part is directed directly to another photo diode PD. The signals from the two photo diodes are sent to the two terminals of a differential amplifier 1105. If the laser drifts from its set wavelength position, the output from the differential amplifier changes. A servo loop now provides for the necessary feedback to tune the laser back to its set frequency value and hence maintain the transmission at its set value T̄ (the locking point LP shown in FIG. 12) by adjusting the voltage that controls the piezo stack; this controls the stretching of the fiber DFB laser and hence the laser wavelength.

Similar results could be obtained for Krypton (Kr) used as absorption gas and tuning the laser to the absorption line at 1537.62 nm.

What is claimed is:

1. A method of producing an active optical waveguide having asymmetric polarisation, said method comprising the steps of:
    (a) providing an active optical waveguide (10) comprising:
        (i) a transverse refractive index profile (21) comprising a guiding region (11) containing an active dopant, a non-guiding region (12) surrounding the guiding region, and an intermediate region (13) between said guiding and non-guiding regions, said intermediate region optionally having the same refractive index as the non-guiding region,
        (ii) a transverse photorefractive dopant profile (31) having a constant or graded photorefractive dopant concentration within at least one of said guiding, non-guiding and intermediate regions, except that the photorefractive dopant is not located solely in the guiding region, and
        (iii) exhibiting in said guiding region, intermediate region, or both, light guiding modes having different polarisations;
    (b) and exposing at least a part (10a, 10b) of the active optical waveguide to an effective transverse illumination of light (20) reacting with the photorefractive dopant and modifying the transverse refractive index profile;
    said part of the active optical waveguide being exposed to a fluence selectively suppressing the propagation of the light guiding modes having different polarisations so that the propagation of one mode is less suppressed than the propagation of the other mode(s).

2. A method according to claim 1, wherein the modified transverse refractive index profile has elevated refractive indices in the guiding region (11) and across the boundary region between the guiding region (11) and the intermediate region (13), and/or in the intermediate region (13), compared to the transverse refractive index profile before being exposed to the transverse illumination of light.

3. A method according to claim 1, wherein the transverse refractive index profile is selected from the group consisting of a step-index profile, a depressed index profile, a graded index profile, and a polarisation maintaining type index profile of the PANDA type, the BOWTIE type, the elliptic stress cladding type, or the elliptical core type.

4. A method according to claim 1, wherein the transverse photorefractive dopant profile is a single- or multi-step concentration profile or a graded concentration profile.

5. A method according to claim 1, wherein the transverse refractive index profile and the transverse photorefractive dopant profile have substantially similar shapes.

6. A method according to claim 1, wherein the intermediate region has the same refractive index as the non-guiding region before exposure.

7. A method according to claim 1, wherein the photorefractive dopant profile has a constant or graded photorefractive dopant concentration within the intermediate region.

8. A method according to claim 1, wherein the transverse photorefractive dopant profile comprises a dopant selected from the group consisting of boron (B), aluminium (Al), phosphor (P), germanium (Ge), and tin (Sn), or a combination thereof.

9. A method according to claim 1, wherein the transverse photorefractive dopant profile in the guiding region has a dopant concentration in the range from 0 to 45 mol-%, preferably from 0 to 35 mol-%, most preferred from 0 to 24 mol-%, particularly from 2 to 12 mol-%.

10. A method according to claim 1, wherein the transverse photorefractive dopant profile in the intermediate region has a dopant concentration in the intermediate region in the range from 0 to 40 mol-%, preferably from 0 to 30 mol-%, most preferred from 0 to 15 mol-%, particularly from 0.1 to 5 mol-%.

11. A method according to claim 1, wherein the transverse photorefractive dopant profile in the non-guiding region has a dopant concentration in the range from 0 to 20 mol-%, preferably from 0 to 5 mol-%, most preferred from 0 to 1 mol-%.

12. A method according to claim 1, wherein the transverse photorefractive dopant profile in the guiding region is substantially constant having germanium as dopant in a concentration in the range from 0 to 45 mol-%, preferably from 0 to 35 mol-%, most preferred from 0 to 24 mol-%, particularly from 2 to 12 mol-%.

13. A method according to claim 1, wherein the transverse photorefractive dopant profile in the intermediate region is substantially constant having germanium as dopant in a concentration in the range from 0 to 40 mol-%, preferably from 0 to 30 mol-%, most preferred from 0 to 15 mol-%, particularly from 0.1 to 5 mol-%.

14. A method according to claim 1, wherein the transverse illumination light has wavelength in the UV range from 50 to 550 nm, particularly from 150 to 380 nm, most preferred from 190 to 270 nm.

15. A method according to claim 1, wherein the exposure lasts for a period of time corresponding to application of a fluence to the active optical waveguide in the range from 1 $J/cm^2$ to 10 $MJ/cm^2$, preferably from 10 $J/cm^2$ to 1 $MJ/cm^2$, most preferred from 100 $J/cm^2$ to 10 $kJ/cm^2$.

16. A method according to claim 1, wherein the active optical waveguide comprises a silica based material doped with an active dopant selected from the rare earth elements, in particular selected from the group consisting of La, Ce, Pr, Nd, Gd, Dy, Ho, Er, Tm, Yb.

17. A method according to claim 1, wherein the active optical waveguide comprises a silica based material doped with a refractive index modifying dopant selected from the group consisting of boron (B), nitrogen (N), fluorine (F), aluminium (Al), phosphor (P), titanium (Ti), germanium (Ge), and tin (Sn), and dopants selected from the group of rare earth elements consisting of La, Ce, Pr, Nd, Gd, Dy, Ho, Er, Tm, and Yb, or combinations of these.

18. A polarisation asymmetric active optical waveguide obtained by the method as claimed in claim 1.

19. A method of producing a single polarisation mode optical waveguide laser having a pump light source and a distributed feedback or distributed Bragg reflector comprising the steps of:
(a) producing a polarisation asymmetric active optical waveguide as claimed in claim 18;
(b) incorporating one or more Bragg gratings in the guiding region, the intermediate region, the non-guiding region, or a combination of these, of said polarisation asymmetric active optical waveguide, optionally simultaneously with the production of the polarisation asymmetric active optical waveguide; and
(c) directing pump light from said pump light source to said polarisation asymmetric active optical waveguide having incorporated said Bragg gratings.

20. A method according to claim 19, wherein the Bragg grating is incorporated in the guiding region, the intermediate region, the non-guiding region, or a combination of these, by interferometrically mixing the transverse illumination light (20) into an interferometric pattern illuminating the active optical waveguide, preferably through a phase mask (51).

21. A method according to claim 19, wherein the transverse illumination light is inhomogeneous to provide an illumination at the center part of the Bragg grating which is different from that of the other parts of the Bragg grating.

22. A method according to claim 19, wherein the center part of the Bragg grating is illuminated with another transverse illumination light than that illuminating the other parts of the Bragg grating.

23. A method according to claim 19, wherein the active optical waveguide is stretched during illumination with the transverse illumination light.

24. A method according to claim 19, wherein the optical waveguide is a polarisation maintaining optical fiber.

25. A single polarisation mode optical waveguide laser having a pump light source and a distributed feedback or distributed Bragg reflector obtainable by a method as claimed in claim 19.

26. Use of a single polarisation mode optical waveguide laser having a pump light source and a distributed feedback or distributed Bragg reflector as claimed in claim 25 in a telecommunication network, or in optical spectroscopy apparatus, or use of such a waveguide, or such a waveguide for which the photorefractive dopant is located solely in the guiding region, in a sensor, or in absolute calibrated laser light sources locked to an absorption line of an absorption gas, preferably acetylene-13 ($^{13}C_2H_2$) or krypton.

27. A method of producing a multi-wavelength single polarisation mode optical waveguide laser having a pump light source and a distributed feedback comprising the steps of:
(A) producing two or more polarisation asymmetric active optical waveguides by the method of
(a) providing an active optical waveguide (10) comprising:
(i) a transverse refractive index profile (21) comprising a guiding region (11) containing an active dopant, a non-guiding region (12) surrounding the guiding region, and an intermediate region (13) between said guiding and non-guiding regions, said intermediate region optically having the same refractive index as the non-guiding region,
(ii) a transverse photorefractive dopant profile (31) having a constant or graded photorefractive dopant concentration within at least one of said guiding, non-guiding and intermediate regions, except that the photorefractive dopant is not located solely in the guiding region, and
(iii) exhibiting in said guiding region, intermediate region, or both, light guiding modes having different polarisations;
(b) and exposing at least a part (10a, 10b) of the active optical waveguide to an effective transverse illumination of light (20) reacting with the photorefractive dopant and modifying the transverse refractive index profile;
said part of the active optical waveguide being exposed to a fluence selectively suppressing the propagation of the light guiding modes having different polarisations so that the propagation of one mode is less suppressed than the propagation of the other mode(s), including such waveguides for which the photorefractive dopant is located solely in the guiding region;

(B) incorporating one or more Bragg gratings in the guiding region, the intermediate region, the non-guiding region, or a combination of these, of said polarisation asymmetric active optical waveguides, as claimed in claim 19 optionally simultaneously with the production of the polarisation asymmetric active optical waveguide; and (C) directing pump light from said pump light source to said polarisation asymmetric active optical waveguides having incorporated said Bragg gratings.

28. A method according to claim 27, wherein the two or more polarisation asymmetric active optical waveguides having incorporated one or more Bragg gratings in the guiding region, the intermediate region, the non-guiding region, or a combination of these, are produced sequentially in the same active optical waveguide, or are produced by splicing together two or more single polarisation mode optical waveguide lasers each having a pump light source and a distributed feedback or distributed Bragg reflector obtained by a method of:

(A) producing a polarisation asymmetric active optical waveguide produced by the method of:
  (a) providing an active optical waveguide (10) comprising:
    (i) a transverse refractive index profile (21) comprising a guiding region (11) containing an active dopant, a non-guiding region (12) surrounding the guiding region, and an intermediate region (13) between said guiding and non-guiding regions, said intermediate region optionally having the same refractive index as the non-guiding region,
    (ii) a transverse photorefractive dopant profile (31) having a constant or graded photorefractive dopant concentration within at least one of said guiding, non-guiding and intermediate regions, except that the photorefractive dopant is not located solely in the guiding region, and
    (iii) exhibiting in said guiding region, intermediate region, or both, light guiding modes having different polarisations;

(b) exposing at least a part (10*a*, 10*b*) of the active optical waveguide to an effective transverse illumination of light (20) reacting with the photorefractive dopant and modifying the transverse refractive index profile; said part of the active optical waveguide being exposed to a fluence selectively suppressing the propagation of the light guiding modes having different polarisations so that the propagation of one mode is less suppressed than the propagation of the other mode(s);

(B) incorporating one or more Bragg gratings in the guiding region, the intermediate region, the non-guiding region, or a combination of these, of said polarisation asymmetric active optical waveguide, optionally simultaneously with the production of the polarisation asymmetric active optical waveguide; and (C) directing pump light from said pump light source to said polarisation asymmetric active optical waveguide having incorporated said Bragg gratings.

29. A method according to claim 27, wherein the two or more polarisation asymmetric active optical waveguides having incorporated said Bragg gratings consist of 1 to 64 such waveguides, preferably 2, 4, 8, 16, 32, or 64 such waveguides.

30. A multi-wavelength single polarisation mode optical waveguide laser having a pump light source and a distributed feedback obtainable by a method as claimed in claim 27.

31. Use of a multi-wavelength single polarisation mode optical waveguide laser having a pump light source and a distributed feedback or distributed Bragg reflector as claimed in claim 29 in a telecommunication network, in a sensor, in optical spectroscopy apparatus, or in absolute calibrated laser light sources locked to one or more absorption lines of an absorption gas, preferably acetylene-13 ($^{13}C_2H_2$) or krypton, or mixtures thereof.

32. Use of a polarisation asymmetric active optical waveguide as claimed in claim 18 in a telecommunication network, or in optical spectroscopy apparatus, or use of such a waveguide, or such a waveguide for which the photorefractive dopant is located solely in the guiding region, in a sensor, or in absolute calibrated laser light sources locked to an absorption line of an absorption gas, preferably acetylene-13 ($^{13}C_2H_2$) or krypton.

* * * * *